(12) United States Patent
Jokinen

(10) Patent No.: US 7,269,251 B1
(45) Date of Patent: Sep. 11, 2007

(54) METHOD AND SYSTEM FOR BILLING SUBSCRIBERS IN A TELECOMMUNICATION NETWORK

(75) Inventor: Vesa-Matti Jokinen, Espoo (FI)

(73) Assignee: Nokia Corporation, Espoo (FI)

( * ) Notice: Subject to any disclaimer, the term of this patent is extended or adjusted under 35 U.S.C. 154(b) by 845 days.

(21) Appl. No.: 09/787,514

(22) PCT Filed: Jul. 18, 2000

(86) PCT No.: PCT/FI00/00653

§ 371 (c)(1), (2), (4) Date: Mar. 19, 2001

(87) PCT Pub. No.: WO01/06753

PCT Pub. Date: Jan. 25, 2001

(30) Foreign Application Priority Data

Jul. 19, 1999 (FI) .................................. 991624

(51) Int. Cl.
H04M 15/00 (2006.01)
H04M 11/00 (2006.01)

(52) U.S. Cl. .................. 379/114.2; 379/114.28; 379/114.05; 379/121.03; 379/114.17; 455/406

(58) Field of Classification Search ............. 379/114.2, 379/114.28, 114.05, 114.06, 114.19, 114.15, 379/114.18, 114.22, 121.03, 127.02, 127.05, 379/144.01, 114.17; 455/406
See application file for complete search history.

(56) References Cited

U.S. PATENT DOCUMENTS

| 5,359,642 A | 10/1994 | Castro ..................... 379/121 |
|---|---|---|
| 5,666,405 A | 9/1997 | Weber ..................... 379/127 |
| 5,765,108 A * | 6/1998 | Martin et al. ............ 455/422.1 |
| 5,862,469 A * | 1/1999 | Antonello et al. .......... 455/405 |
| 6,026,291 A * | 2/2000 | Carlsson et al. ............ 455/406 |
| 6,044,360 A * | 3/2000 | Picciallo ..................... 705/21 |
| 6,282,274 B1* | 8/2001 | Jain et al. .............. 379/114.26 |
| 6,327,348 B1* | 12/2001 | Walker et al. ........... 379/91.01 |
| 6,377,938 B1* | 4/2002 | Block et al. .................. 705/32 |
| 6,393,275 B1* | 5/2002 | Alfred ..................... 455/422.1 |
| 6,564,047 B1* | 5/2003 | Steele et al. ................ 455/405 |
| 6,987,844 B2* | 1/2006 | Himmel et al. .......... 379/114.2 |

FOREIGN PATENT DOCUMENTS

| FI | 991624 | 7/1999 |
|---|---|---|
| GB | 2322771 A | 9/1998 |
| WO | WO98/38789 | 9/1998 |
| WO | WO99/01998 | 1/1999 |

* cited by examiner

Primary Examiner—Barry Taylor
(74) Attorney, Agent, or Firm—Pillsbury Winthrop Shaw Pittman LLP; Larry J. Hume

(57) ABSTRACT

The invention relates to a method of changing a balance of a subscriber (MS1 . . . MS6) belonging to a subscriber group (G1, G2) of a telecommunication network. The invention comprises forming at least one subscriber group (G1, G2) comprising two or more subscribers (MS1 . . . MS6), forming a prepaid balance for each subscriber (MS1 . . . MS6), which prepaid balance is charged when services of the telecommunication network are used, and determining at least one subscriber (MS1 . . . MS6) in the group as a master subscriber, who has a right to carry out money transfers (3-14) between the prepaid balances of the members (MS1 . . . MS6) in the group.

21 Claims, 3 Drawing Sheets

FIG. 2

| group | subscriber | priority | prepaid balance | account credit limit |
|---|---|---|---|---|
| G1 | Ms1 | 1 | 1000 | 1000 |
| G1 | Ms2 | 4 | 200 | - |
| G1 | Ms3 | 2 | 100 | - |
| G2 | Ms4 | 4 | 100 | - |
| G2 | Ms5 | 4 | 200 | - |
| G2 | Ms6 | 1 | -300 | 1000 |

METHOD AND SYSTEM FOR BILLING SUBSCRIBERS IN A TELECOMMUNICATION NETWORK

FIELD OF THE INVENTION

The invention relates to billing subscribers in a telecommunication network.

BACKGROUND OF THE INVENTION

Telecommunication networks provide subscribers with various telecommunication services for which a network operator or a service provider bills the subscriber to a service or the user of a network connection. The most common telecommunication service is a speech call or a data call, for which the user is charged based on the duration of a call, for example, according to a given call tariff. Conventionally, call charges over a certain billing period are collected together and the subscriber or the owner of the network connections is billed afterwards. However, tariffs and charges for mobile calls, international calls and various special services may be quite high, which may result in unexpectedly high call charges over a billing period. In order to avoid unpleasant surprises, some subscribers wish to set a maximum limit to charges for calls made during a given period by themselves, members of their family or their employees. This can be implemented such that, for example, when the accumulated charges of a certain subscriber or subscriber group reach a given limit, the subscriber is prevented from using the network or services, and thus causing more charges.

In some telecommunication systems, the subscriber may prepay all his or her telecommunication services. In such a case, the subscriber can use the services only if he or she has a positive prepaid balance; when the prepaid balance becomes zero or when it is too low for the requested service, no service will be provided. In the present application, subscribers who are charged based on prepayment or a certain credit limit are called balance-limited subscribers. Balance limits are set by using contracts between the subscriber (or the owner of the connection) and the network operator or service provider through the service point of the network operator. If, for example, those who are responsible for the expenditures (e.g. parents) have provided other subscribers (e.g. children) with a certain prepaid balance per month and the balance has been exhausted before the proper time and those who are responsible have wished to increase available operation time (to enable a child to make calls after the previously agreed balance is overdrawn), they have been compelled to carry out this function through the service point of the network operator, which has not only been difficult for the subscriber but also required administrative work from the operator, thus causing delay.

BRIEF DESCRIPTION OF THE INVENTION

An objective of the invention is to provide a simpler and more flexible way to manage subscriber billing in telecommunication networks.

This and other objectives of the invention are achieved by the invention defined in the accompanying independent claims. Preferred embodiments of the invention are disclosed in the dependent claims.

According to a basic idea of the invention, at least one subscriber billing group is formed which comprises two or more subscribers (family members or employees of a small-sized enterprise, for example). Each subscriber has a billing account of his or her own in a billing database of the network operator (or service provider). The billing account of each subscriber is charged in a usual manner when the subscriber uses the services of the telecommunication network. At least one subscriber in the group is specified as a master subscriber, who has a right to carry out predetermined procedures in and between the accounts of said billing group in said billing database through said telecommunication network. The procedures include transferring a prepaid balance from an account to another, changing the billing limit, transferring a bill or a billing right between different subscribers, etc. The subscribers in the subscriber group may also have different rights, for example such that some of the subscribers have a right to check the balance only within the group while some have a right to check their personal balance only. An advantage of the invention is that the master subscriber may quickly and easily carry out a desired balance facility; for example, he or she may change the prepaid balance within the subscriber group directly from his or her terminal without the intervention of the manned service point and the related administrative work of the operator. The master subscriber may carry out the functions by utilizing any suitable telecommunication service, such as a facility call, short message service or Internet service, e.g. WAP (Wireless Application Protocol). A facility call refers to a call to a predetermined number, wherein a predetermined procedure (e.g. voice frequency key selection) is carried out. User help announcements may readily be included in the facility calls.

The rights of the master subscriber can be identified based on the unique authentication or subscriber data of the telecommunication network or the connection protocol used or a separate authentication procedure, such as a PIN (Personal Identification Number) in the facility call.

BRIEF DESCRIPTION OF THE DRAWINGS

The invention is now described in closer detail in connection with the preferred embodiments and with reference to the accompanying drawings, in which FIG. 2 shows a subscriber database.

DETAILED DESCRIPTION OF THE INVENTION

The invention can be applied to any telecommunication network for billing management of telecommunication services in the network or value-added services (of separate service providers) provided through the network.

In the following, a subscriber who has a right to carry out an accounting facility (operating right) is called a host subscriber, master subscriber or a higher-priority subscriber. A lower-priority subscriber refers to a subscriber who does not have all the rights of a higher-priority subscriber. The lower-priority subscriber has, for example, a right to receive money from the higher-priority subscriber but the lower-priority subscriber does not have a right to transfer money to the higher-priority subscriber. The lower-priority subscriber may also be called a balance-limited subscriber since he or she has a prepaid balance or a credit limit to limit the use of services. A facility, in turn, primarily refers to changing the balance/limit, i.e. increasing or decreasing the balance/limit, but it may also refer to any other billing-related transaction, such as transferring a bill or a billing right between different subscribers.

Figure 1:
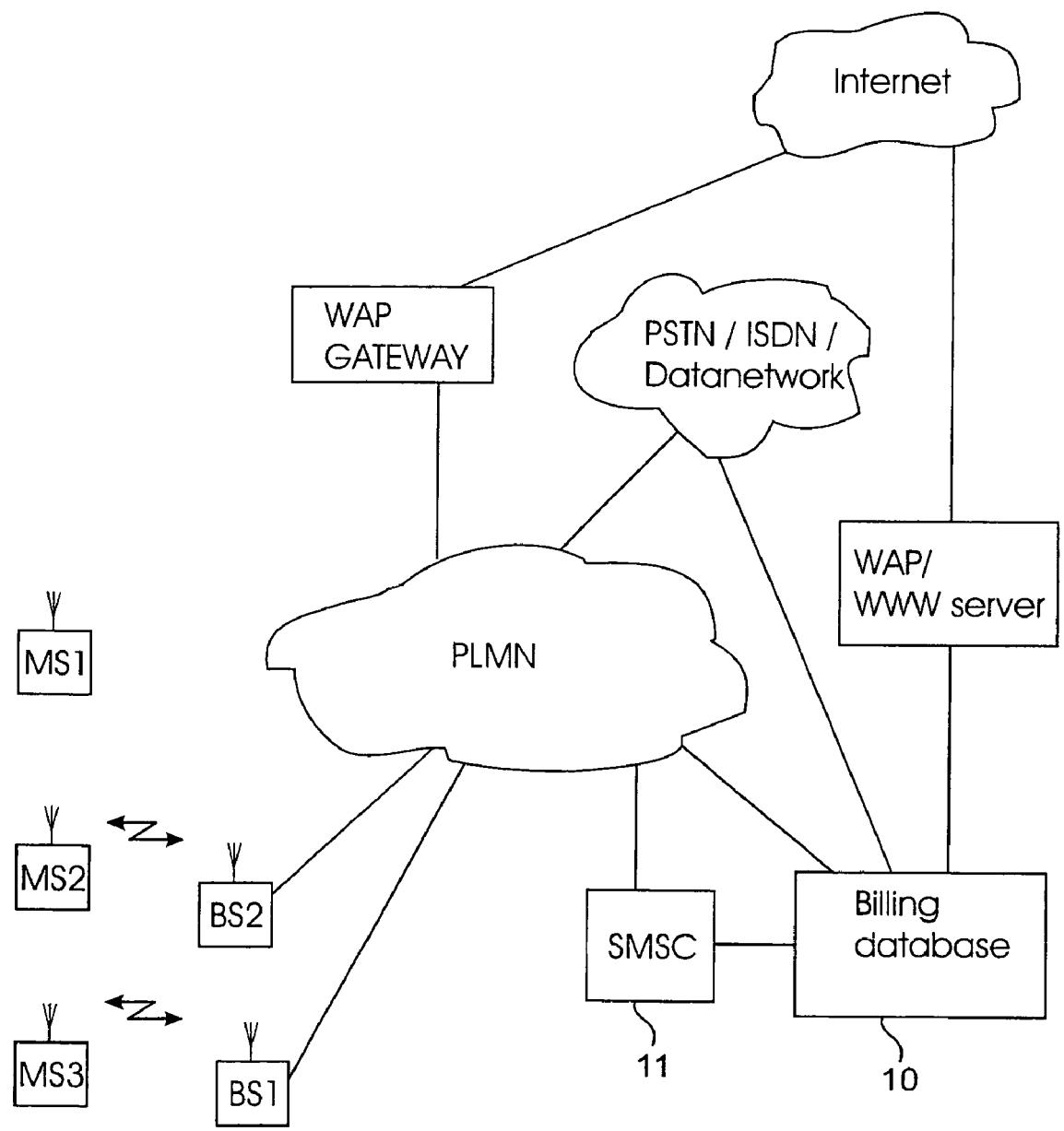
FIG. 1 shows different embodiments of a mobile station being connected to a server of an operator.

FIG. 1 shows a mobile communication system PLMN (Public Land Mobile Network) including user-operated billing management according to the invention. Mobile stations MS1, MS2, MS3 and MS4 are connected to the PLMN over a radio path (or by another wireless interface) via base stations BS. The mobile stations communicate with another PLMN via a base station. Connections from the PLMN to other telecommunication networks, such as a PSTN (Public Switched Telephone Network), ISDN (Integrated Services Digital Network), public data network, or the Internet (TCP/IP networks), can be established in a manner known per se. An example of the PLMN is a GSM. The precise structure and operation of the GSM network is not relevant to the invention, and as far as the GSM network is concerned, reference is made to the GSM standards issued by the European Telecommunications Standards Institute. It should be noted, however, that, in addition to mobile communication networks, the invention can be applied to other telecommunication networks as well.

In the example of FIG. 1, information on subscriber billing accounts is located in a billing database 10 managed by a PLMN operator. The invention can also be applied to billing service providers, for example, which can be located in a separate database. In the present application, the term 'billing database' should be understood to generally refer to any unit, facility or application which maintains real-time subscriber billing information, such as a prepaid balance or accumulated credit balance. A billing account refers to any information structure which comprises at least balance information or other such information.

FIG. 2 shows an example of a structure of a billing database. FIG. 2 only shows information structures that are relevant to the understanding of the invention, but the database can, of course, comprise a great amount of different information for a large number of subscribers. FIG. 2 shows two billing subscriber groups G1 and G2. The first group G1 comprises subscriber identifiers of mobile stations MS1, MS2 and MS3, priorities 1, 4 and 2 set for the identifiers, and the subscribers' prepaid balances and potential account credit limits. The second group G2 comprises subscriber identifiers of mobile stations MS4, MS5 and MS6, priorities 4, 4 and 1 set for the identifiers, and the prepaid balances and potential account credit limits. Although the prepaid balance of the subscriber of the mobile station MS6 is −300 units, he or she can still use 700 units during a given billing period, for example, since he or she has 1000 units of credit in his or her account. The credit limit of a lower-priority subscriber can also be obtained from the balance of the master subscriber since the master subscriber has a right to transfer a sum corresponding to the sum between the account credit limit of the master subscriber and the prepaid balance to the lower-priority subscriber.

In FIG. 2, the highest priority is priority 1 and the lowest priority is priority 4. A subscriber whose identifier has a higher priority has a right to transfer money from his or her own account to the balances of all the subscribers with a lower priority than the subscriber at issue. The higher-priority subscriber also has a right to transfer money from the balance of the lower-priority subscriber. If a subscriber has no priority ("−"), the subscriber has no right to receive nor transfer money. In a typical situation, one subscriber has priority 1 (master subscriber) and others priority 4 (no right to transfer money). More than one of the members in a group can be set as a master subscriber, who has the right to transfer money. Hence, for example, both parents in a family can be master subscribers.

Figure 3:
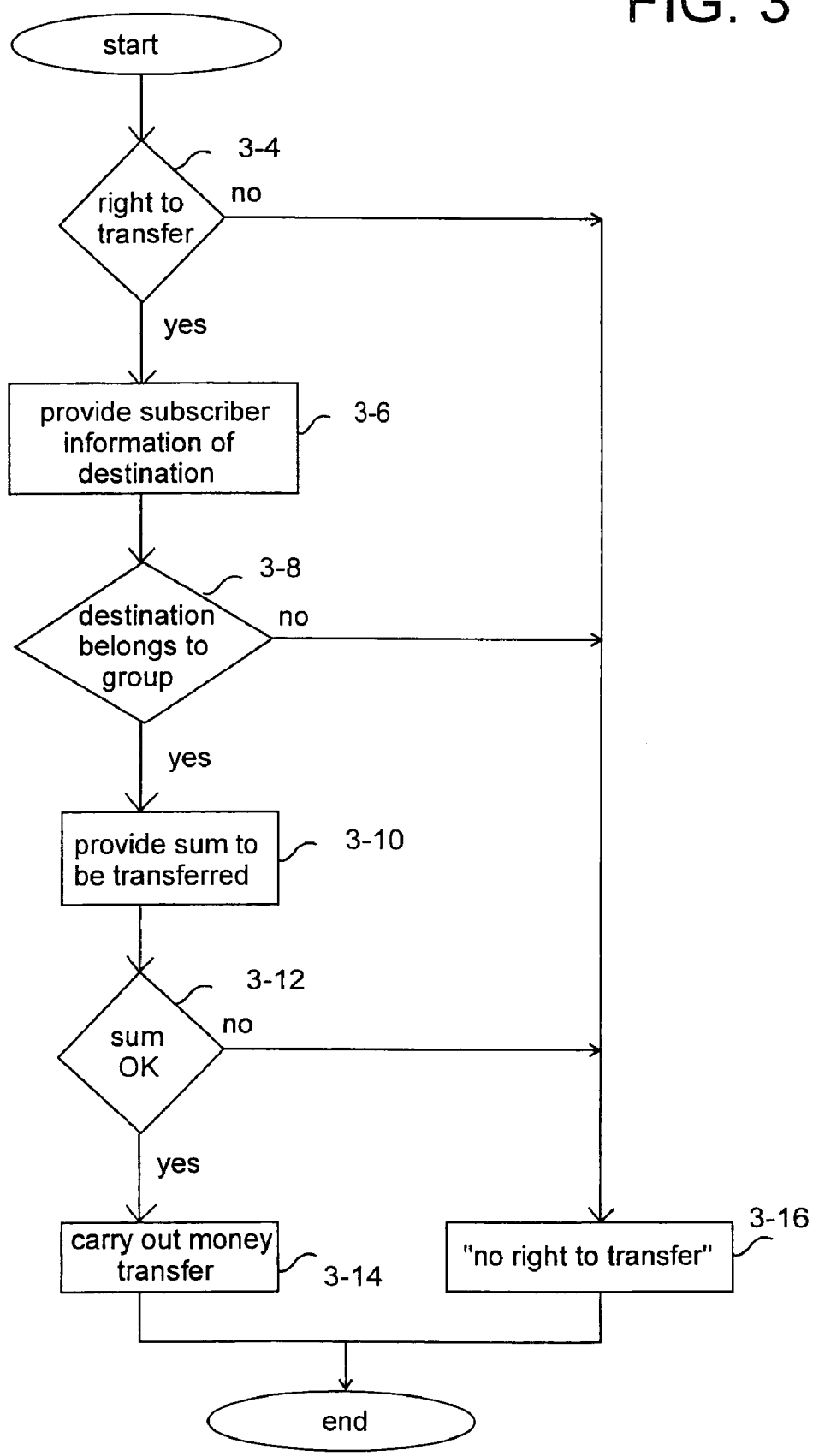
FIG. 3 is a flow diagram illustrating a balance transfer according to the invention.

FIG. 3 is a flow diagram illustrating a balance transfer according to the invention after subscriber information has been stored in a subscriber database, at least one subscriber group has been formed of the subscribers and priorities have been set for the members in the group.

In a first preferred embodiment of the invention, the master subscriber establishes a common facility call to a predetermined service number. The service number preferably comprises an interactive answering device to provide the subscriber with voice prompts. By following these prompts, the subscriber can carry out the facility. The subscriber may issue instructions by, for example, keying in certain codes (DTMF codes) on the keypad of his or her terminal or by giving speech instructions. The answering device is connected to the billing database so as to enable it to carry out the billing facilities desired by the subscriber.

At the beginning of the facility call, in step 3-4, it is checked whether or not the subscriber has a right to carry out the facility of the invention. The subscriber can be authenticated (identified) on the basis of, for example, the authentication of the connection used by the master subscriber (e.g. GSM network subscriber authentication), or by using another authentication procedure and/or separate-identifier, such as a PIN identifier. When the subscriber is verified, the rights of the subscriber can be checked in the billing database and the subscriber can be allowed billing facilities accordingly.

If the subscriber has the right to carry out the facility, i.e. the subscriber is a master subscriber in regard to at least one other subscriber in the same subscriber group, the process proceeds to step 3-6. In this step, the subscriber provides subscriber information on the subscriber to whom the facility is directed. In step 3-8, it is checked whether the destination of the facility belongs to the subscriber group, and if so, the process proceeds to the next step. In step 3-10, the master subscriber provides the amount of money to be transferred, i.e. the amount by which the balance of the destination of the facility is increased, and, in step 3-12, it is checked that the amount of money is large enough to cover, for example, more than one call made during the daytime but nevertheless not too large (e.g. many times the annual subscriptions of the subscriber) in order to avoid potential abuse. If the amount of money is of a correct size between, for example, 50 and 1000 monetary units, the process proceeds to step 3-14, where the facility is carried out, in other words, for example, money is transferred (for example, 100 monetary units are transferred from the prepaid balance of the subscriber MS1 to the prepaid balance of the subscriber MS3 in FIG. 2) to a balance within the subscriber group. This means that in connection with a facility call, for example, the billing system of the telecommunication network automatically charges the master subscriber a sum according to the facility call of the master subscriber and the transferred balance, and the prepaid balance of the member of the prepaid group determined in the facility call is credited with a sum corresponding to the amount of said transferred balance.

If the subscriber has no right to carry out the facility and/or if the destination of the facility does not belong to the subscriber group and/or if the priority of the destination is higher than the priority of the performer of the facility and/or if the amount of money to be transferred is not of the correct size and/or if the account to be charged has too low a balance or credit, the facility will not be carried out. This can be indicated to the person trying to carry out the facility by using a short message, for example, which comprises a message "No right to transfer" or "No right to carry out the facility", for example.

The master subscriber may, in addition to the above-described changing of balance, make inquiries about the balance of the lower-priority subscriber, call itemization of the lower-priority subscriber or location of the lower-priority subscriber.

The balance transfer or another facility of the invention may also take place by means of a short message service. In such a case, the master subscriber communicates with a short message centre SMSC 11 through short messages. The master subscriber may, for example, provide, as a short message, pieces of relevant information to performing the facility requested by the SMSC one piece at a time, and this information is transmitted to the SMSC. On the basis of this information, the subscriber may or may not be allowed to proceed to the next step. The short message centre SMSC 11 is connected to the billing database 10 to enable the desired billing facilities in the database 10 to be carried out.

An alternative is to arrange the facility call as an Internet connection, in which case the user interface is a WWW site. Through the interactive WWW site, the master subscriber can provide all relevant pieces of information, including the pieces of information inquired on the WWW pages, one at a time, the information being transmitted to the operator, and, in response to the information transmitted to the operator and the checking carried out by the operator, the facility required by the mobile station is either carried out or not. For example, the checks "Has the subscriber a right to carry out the facility?", "Does the destination of the facility belong to the group?" and "Is the amount of money to be transferred of the correct size?" can be carried out according to the flow diagram of FIG. 3, for example.

In order to carry out the facility, the mobile station can establish a data connection to a gateway or a WAP (Wireless Application Protocol) gateway. The gateways, in turn, are connected to the Internet and/or an intranet. An Internet server of a public Internet service provider or a private Internet connection point, for example, may serve as a gateway. In both cases, the established connection may be any data or modem connection which is used for Internet connections.

In order for the mobile station to be able to communicate with the Internet, the mobile station is equipped with an Internet browser. The Internet browser may transmit requests to the gateway and receive and process the content of the WWW (World Wide Web) pages received from the gateway. The gateway forwards the requests received from the mobile station to the WWW server through the Internet according to the standard Internet protocols. The gateway thus serves as the transmitter of the requests on behalf of the user of the mobile station. In response to the request, the WWW server transmits the requested WWW pages to the gateway, which directs the WWW pages to the browser of the mobile station, which shows the retrieved WWW pages to the user on the display of the mobile station.

A terminal which enables the master subscriber to carry out the facility of the invention may be any terminal equipped with an Internet facility, such as the mobile station above, a mobile station connected to a computer, data terminal equipped with a mobile communication facility, etc. The data connection between the terminal and the gateway may be a circuit- or packet-switched connection, virtual connection such as ATM (Asynchronous Transfer Mode), etc.

Another alternative for directing the facility request of the mobile station to the operator and carrying out the facility in response to the facility request is to use a terminal according to the WAP (Wireless Application Protocol) standard. The WAP specifies the application framework and network protocols for wireless equipment, such as mobile stations, paging devices and personal digital assistants. The specifications extend telecommunication technologies (e.g. digital network standards) and Internet technologies (e.g. XML, URL, various content formats). The WAP specifies a series of standard components that enable communication between terminals and WWW servers.

The content and applications of the WAP are specified in a series of known content formats based on known WWW content formats. The most common WAP content format is a WML (Wireless Markup Language), which is used for creating WAP pages. The WAP pages can be displayed by a WAP browser, e.g. by a microbrowser of a wireless terminal, which is an analogous standard for the WWW browser. The WAP content types and protocols are optimized for mass market and manually-operated devices.

When the mobile station establishes the data connection to the Internet through the WAP gateway, the WAP gateway provides a connection between the telecommunication network and the Internet WWW technology. The WAP gateway converts a WAP request to a WWW request and, at the same time, enables the WAP microbrowser in the mobile station to transmit requests to the WWW server. When the WAP connection is used for carrying out the facility of the invention, the content of the WWW pages can be created such that the use of the WAP and the content format WML of the WAP is taken into account by using, for example, the WML language on the WWW pages. In such a case, the mobile station is equipped with a WAP microbrowser. The data connection through the telecommunication network is similar to that described above.

It is obvious to one skilled in the art that as technology advances, the basic idea of the invention can be implemented in many different ways. The invention and its embodiments are thus not restricted to the above-described examples but they can vary within the scope of the claims.

The invention claimed is:

1. A method for managing subscriber billing in a telecommunication network, wherein each subscriber has billing accounts that are charged when services of the telecommunication network are used, the method comprising:

forming a subscriber billing group, the subscriber billing group comprising two or more subscriber billing accounts;

assigning to each subscriber of the subscriber billing group an identification associated with at least one type of access right; and indicating on the basis of the access right, different rights to manage accounts of the subscriber billing group and to carry out predetermined procedures in or between the accounts of the subscriber billing group.

2. A method as claimed in claim 1, wherein a master subscriber has the right to access the billing group through the telecommunication network.

3. A method as claimed in claim 2, wherein the master subscriber carries out balance transfers between the billing accounts within the group.

4. A method as claimed in claim 2, wherein the billing account has a limited balance, and the master subscriber changes the balance limit or balance of the billing account.

5. A method as claimed in claim 4, wherein the billing account is a prepayment account and/or an account equipped with a credit limit.

6. A method as claimed in claim 5, wherein the credit limit is obtained from the balance of the master subscriber.

7. A system as claimed in claim 1, further comprising forming the subscriber billing group into a billing database.

8. A system as claimed in claim 7, wherein a master subscriber has the right to access the billing database through the telecommunication network.

9. A system for managing billing accounts of several subscribers, wherein each subscriber has a billing account that is charged when services of a telecommunication network are used, the system comprising:
  one or more subscriber billing groups, wherein each subscriber billing group comprising two or more subscriber billing accounts,
  access right indicators, each indicating a specific right to manage accounts of the subscriber billing group and to carry out predetermined procedures in or between the accounts of the subscriber billing group,
  an identification for each subscriber, wherein the identification is associated with at least one access right indicator; and
  data processing means for carrying out the account managing and the predetermined procedures.

10. A system as claimed in claim 9, further comprising means for providing access for a master subscriber to the billing group through the telecommunication network.

11. A system as claimed in claim 10, wherein the master subscriber has access to a telecommunication service by making a facility call to a predetermined service number.

12. A system as claimed in claim 11, wherein a telecommunication server to which the master subscriber connects is an automatic answering apparatus.

13. A system as claimed in claim 10, wherein a telecommunication server to which the master subscriber connects is a World Wide Web (WWW) server.

14. A system as claimed in claim 10, wherein a telecommunication server to which the master subscriber connects is a Wireless Application Protocol (WAP) server.

15. A system as claimed in claim 10, wherein a telecommunication server to which the master subscriber connects is a short message centre or a short message server.

16. A system as claimed in claim 9, wherein the account managing and the predetermined procedures comprise a balance transfer between the billing accounts within the group.

17. A system as claimed in claim 9, wherein the billing account has a limited balance, and the account managing and the predetermined procedures comprise changing the balance limit or balance of the billing account.

18. A system as claimed in claim 17, wherein the billing account is a prepayment account and/or an account equipped with a credit limit.

19. A system as claimed in claim 18, further comprising means for obtaining the credit limit from the balance of a master subscriber to the billing database.

20. A network element configured to:
  obtain information on at least one subscriber billing group, comprising two or more subscriber billing accounts and, for each subscriber of said subscriber billing group, an identification associated with at least one type of access right to manage accounts, and
  use the identification to determine the access right of the subscriber among different access rights to manage accounts of the subscriber billing group and to carry out predetermined procedures in or between the accounts of the subscriber billing group.

21. A network element configured to
  obtain information on at least one subscriber billing group comprising two or more subscriber billing accounts and, for each subscriber of said subscriber billing group, an identification associated with at least one type of access right to manage accounts,
  use the identification to determine the access right of the subscriber among different access rights to manage accounts of the subscriber billing group and to carry out predetermined procedures, other than collecting billing information, in or between the accounts of the subscriber billing group.

* * * * *